United States Patent
Hosokawa et al.

(10) Patent No.: US 9,210,338 B2
(45) Date of Patent: Dec. 8, 2015

(54) IMAGE PROCESSING DEVICE AND IMAGE PROCESSING METHOD, AND PROGRAM

(71) Applicant: SONY CORPORATION, Tokyo (JP)

(72) Inventors: Kenichiro Hosokawa, Kanagawa (JP); Masashi Uchida, Tokyo (JP); Takahiro Nagano, Kanagawa (JP); Yasuhiro Matsuda, Tokyo (JP)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 13/851,390

(22) Filed: Mar. 27, 2013

(65) Prior Publication Data

US 2013/0308025 A1 Nov. 21, 2013

(30) Foreign Application Priority Data

May 15, 2012 (JP) .................................. 2012-111711

(51) Int. Cl.
- H04N 5/335 (2011.01)
- H04N 9/04 (2006.01)
- H04N 5/232 (2006.01)

(52) U.S. Cl.
CPC ............... *H04N 5/335* (2013.01); *H04N 9/045* (2013.01); *H04N 5/23229* (2013.01)

(58) Field of Classification Search
None
See application file for complete search history.

(56) References Cited

U.S. PATENT DOCUMENTS

| | | | |
|---|---|---|---|
| 2004/0042677 A1* | 3/2004 | Lee | 382/254 |
| 2005/0152610 A1* | 7/2005 | Hagiwara et al. | 382/239 |
| 2006/0001748 A1* | 1/2006 | Kamon et al. | 348/234 |
| 2007/0216777 A1* | 9/2007 | Quan et al. | 348/222.1 |
| 2008/0075393 A1* | 3/2008 | Kwon et al. | 382/300 |
| 2008/0284889 A1* | 11/2008 | Kinoshita | 348/308 |
| 2008/0317454 A1* | 12/2008 | Onuki | 396/128 |
| 2009/0040343 A1* | 2/2009 | Kao | 348/246 |
| 2010/0104202 A1* | 4/2010 | Chen et al. | 382/218 |
| 2010/0141810 A1* | 6/2010 | Wang et al. | 348/246 |
| 2010/0290716 A1* | 11/2010 | Mori et al. | 382/309 |
| 2010/0302433 A1* | 12/2010 | Egawa | 348/345 |
| 2011/0013053 A1* | 1/2011 | Chen et al. | 348/246 |
| 2011/0052051 A1* | 3/2011 | Takeshita | 382/165 |
| 2011/0069192 A1* | 3/2011 | Sasaki | 348/222.1 |
| 2011/0149123 A1* | 6/2011 | Matsuoka | 348/247 |
| 2011/0205404 A1* | 8/2011 | Tamura et al. | 348/241 |
| 2011/0228131 A1* | 9/2011 | Iwane | 348/231.99 |
| 2011/0262045 A1* | 10/2011 | Ichikawa | 382/218 |
| 2012/0069195 A1* | 3/2012 | Chang et al. | 348/182 |
| 2012/0169936 A1* | 7/2012 | Persson et al. | 348/609 |
| 2012/0189200 A1* | 7/2012 | Nakamura | 382/167 |
| 2012/0257825 A1* | 10/2012 | Yoo et al. | 382/167 |
| 2013/0142441 A1* | 6/2013 | Goto | 382/218 |
| 2013/0223731 A1* | 8/2013 | Kawazu | 382/165 |
| 2014/0211979 A1* | 7/2014 | Kawazu | 382/100 |

FOREIGN PATENT DOCUMENTS

JP 2010-066925 3/2010

* cited by examiner

*Primary Examiner* — Michael Osinski
(74) *Attorney, Agent, or Firm* — Paratus Law Group, PLLC

(57) ABSTRACT

There is provided an image processing device including a characteristic estimation portion that, from one of image information obtained from an image sensor and information attached to the image information, estimates a characteristic of the image sensor that is used to generate the image information, and a processing portion that processes the image information in accordance with the characteristic of the image sensor estimated by the characteristic estimation portion.

19 Claims, 12 Drawing Sheets

FIG. 6

|  |  |  |  |
|---|---|---|---|
| LG | B | LG | B |
| R | G | R | G |
| LG | B | LG | B |
| R | G | R | G |

(4)

|  |  |  |  |
|---|---|---|---|
| W | R | W | G |
| B | W | G | W |
| W | G | W | R |
| G | W | B | W |

(3)

|  |  |  |  |
|---|---|---|---|
| G | G | B | G |
| R | G | G | G |
| G | G | B | G |
| R | G | G | G |

(2)

|  |  |  |  |
|---|---|---|---|
| B | G | B | G |
| G | R | G | R |
| B | G | B | G |
| G | R | G | R |

| G (P1) | B (P2) | G (P3) | B (P4) |
|---|---|---|---|
| R (P5) | G (P6) | R (P7) | G (P8) |
| G (P9) | B (P10) | G (P11) | B (P12) |
| R (P13) | G (P14) | R (P15) | G (P16) |

IMAGE PROCESSING DEVICE AND IMAGE PROCESSING METHOD, AND PROGRAM

BACKGROUND

The present technology relates to an image processing device and an image processing method, and a program that make it possible to perform processing of image information obtained from an image sensor in accordance with characteristics of the image sensor.

In an image signal generated by an imaging device, there are cases, for example, in which quality deteriorates as a result of noise of an image sensor, or as a result of signal transformation performed in accordance with a pixel array. In this type of case, image processing is performed to remove noise included in the image signal and to improve image quality etc. In JP 2010-66925A, for example, image quality of a captured image is enhanced while taking into consideration characteristics of an image sensor.

SUMMARY

However, various image sensors have been developed in recent years, and when image quality improvement processing is performed on RAW image data generated using such an image sensor, it is necessary each time to create a dedicated algorithm that is adapted for the image sensor.

Here, the present technology provides an image processing device and an image processing method, and a program that make it possible to perform processing of image information obtained from an image sensor in accordance with characteristics of the image sensor.

According to a first embodiment of the present technology, there is provided an image processing device including a characteristic estimation portion that, from one of image information obtained from an image sensor and information attached to the image information, estimates a characteristic of the image sensor that is used to generate the image information, and a processing portion that processes the image information in accordance with the characteristic of the image sensor estimated by the characteristic estimation portion.

With the present technology, an image processing device estimates, from RAW image data that is image information obtained from an image sensor, or from information attached to the RAW image data, characteristics of the image sensor used to generate the RAW data. In the estimation of the characteristics of the image sensor, it is determined, from among pixel array patterns that are postulated in advance, which of the pixel array patterns is most similar to an array of pixels that are spatially close to each other and that have the same characteristics, thus estimating the pixel array pattern of the image sensor that has generated the RAW image. In the determination of the most similar pixel array pattern, for example, a correlation characteristic amount is calculated between the pixel array pattern and each of the pixel array patterns postulated in advance, and the most similar pixel array pattern is determined based on the calculated correlation characteristic amounts. Further, the image processing device estimates relationships between pixels in the estimated pixel array pattern. For example, based on a pixel value average, white component pixels or pixels having a different charge storage time, in the estimated pixel array pattern, are determined. In addition, based on a histogram of pixel values, green component pixels in the pixel array pattern are determined. The image processing device performs processing of the RAW image data in accordance with the characteristics of the estimated image sensor, and performs, for example, at least one of image quality improvement processing, image classification processing, and image processing.

According to a second embodiment of the present technology, there is provided an image processing method including estimating, from one of image information obtained from an image sensor and information attached to the image information, a characteristic of the image sensor, and processing the image information in accordance with the estimated characteristic of the image sensor.

According to a third embodiment of the present technology, there is provided a program for causing a computer to process image information obtained from an image sensor, the program causing the computer to perform estimating, from one of the image information obtained from the image sensor and information attached to the image information, the characteristic of the image sensor, and processing the image information in accordance with the estimated characteristic of the image sensor.

Note that the program of the present technology is a program that can be provided using a storage medium and a communication medium that is provided to a general-purpose computer that can execute various program codes in a computer-readable form, for example, a storage medium such as an optical disc, a magnetic disk, a semiconductor memory or a communication medium such as a network. By providing the program in the computer-readable form, a process according to the program is realized on a computer.

According to the embodiments of the present disclosure described above, characteristics of an image sensor are estimated from image information obtained from the image sensor, or from information attached to the image information, and image processing is performed in accordance with the characteristics of the estimated image sensor. As a result, the processing of the image information obtained from the image sensor can be performed in accordance with the characteristics of the image sensor used to generate the image information. Further, it is not necessary to develop an image processing device for each type of the image sensor, and thus a development period can be shortened and development costs can be reduced.

BRIEF DESCRIPTION OF THE DRAWINGS

FIG. 6 is a diagram exemplifying a pixel array of an image sensor;

FIG. 7 is a diagram illustrating a case in which a pixel array is a Bayer array;

DETAILED DESCRIPTION OF THE EMBODIMENT(S)

Figure 1:
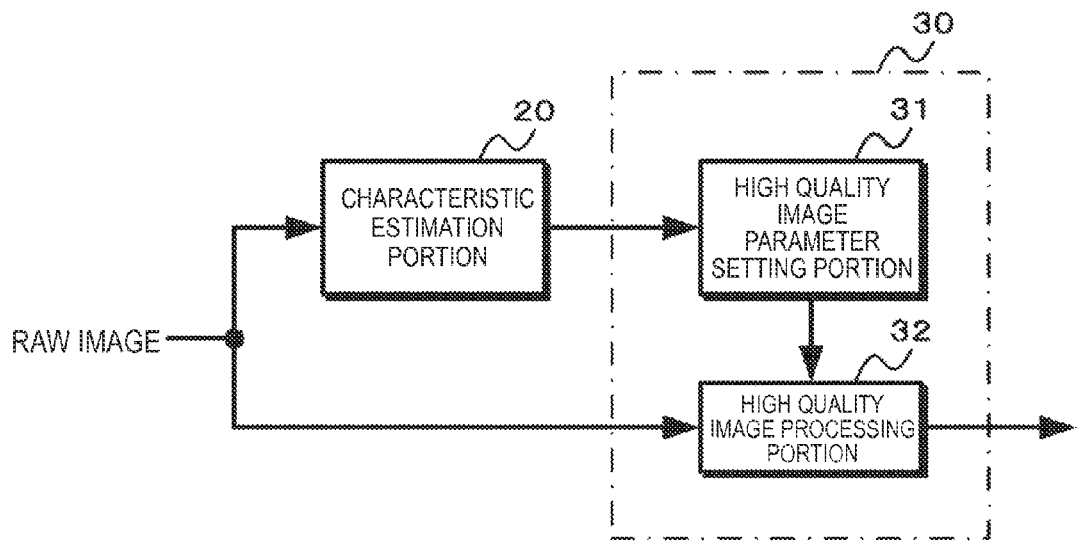
FIG. 1 is a diagram showing a configuration of an image processing device according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the embodiments of the present technology will be explained with reference to the drawings. Note that the explanation will be made in the following order.

1. First embodiment
1.1 Configuration of image processing device
1.2 Operations of image processing device
2. Second embodiment
2.1 Configuration of image processing device
2.2 Operations of image processing device
3. Third embodiment
3.1 Configuration and operations of third embodiment 1. First Embodiment 1.1 Configuration of Image Processing Device FIG. 1 shows a configuration of an image processing device 10 according to a first embodiment. The image processing device 10 includes a characteristic estimation portion 20 and a processing portion 30.

The characteristic estimation portion 20 estimates characteristics of an image sensor based on RAW image data that is image information obtained from the image sensor. The characteristic estimation portion 20 outputs an estimation result to the processing portion 30. Further, when characteristic information showing the characteristics of the image sensor is included in the RAW image data, the characteristic estimation portion 20 acquires the characteristic information instead of estimating the characteristics of the image sensor, and outputs the characteristic information to the processing portion 30.

The processing portion 30 performs processing of the RAW image in accordance with the characteristics of the image sensor estimated by the characteristic estimation portion 20. For example, the processing portion 30 is configured to include an image quality improvement parameter setting portion 31 and an image quality improvement processing portion 32 and performs image quality improvement processing on the RAW image.

Image quality improvement parameters that are used to perform image quality improvement processing are stored in advance in the image quality improvement parameter setting portion 31, for each type of the image sensor. Based on the estimation result from the characteristic estimation portion 20 or on the acquired characteristic information, the image quality improvement parameter setting portion 31 selects image quality improvement parameters corresponding to the estimation result or to the characteristic information and outputs the selected parameters to the image quality improvement processing portion 32.

The image quality improvement processing portion 32 uses the image quality improvement parameters supplied from the image quality improvement parameter setting portion 31 to perform image quality improvement processing of the RAW image supplied from the image sensor.

Figure 2:
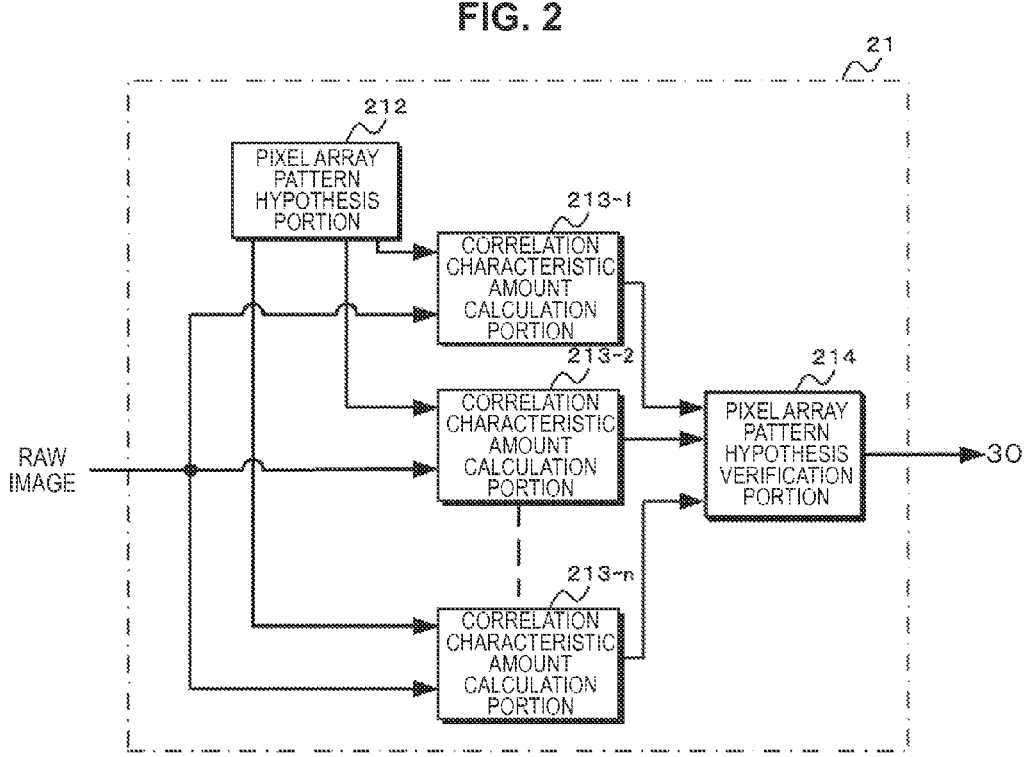
FIG. 2 is a diagram showing a configuration of a characteristic estimation portion.

FIG. 2 shows a configuration of the characteristic estimation portion 20. The characteristic estimation portion 20 is provided with a pixel array pattern estimation portion 21 that estimates a pixel array pattern of the image sensor that is used to generate the RAW image data. The pixel array pattern estimation portion 21 determines, from among pixel array patterns that are postulated in advance, which of the pixel array patterns is most similar to an array of pixels that are spatially close and that have the same characteristics, and thus estimates the pixel array pattern of the image sensor that has generated the RAW image data. For example, the pixel array pattern estimation portion 21 calculates a correlation characteristic amount between the pixel array pattern and each of the pixel array patterns postulated in advance, and determines the most similar pixel array pattern based on the calculated correlation characteristic amounts.

The pixel array pattern estimation portion 21 includes a pixel array pattern hypothesis portion 212, correlation characteristic amount calculation portions 213-1 to 213-$n$ and a pixel array pattern hypothesis verification portion 214.

In order to calculate the correlation characteristic amount between the pixel array pattern and each of the pixel array patterns postulated in advance, the pixel array pattern hypothesis portion 212 generates correlation pattern information based on a hypothesis that corresponds to the pixel array pattern. The pixel array pattern hypothesis portion 212 outputs the correlation pattern information to the correlation characteristic amount calculation portions 213-1 to 213-$n$. The pixel array pattern hypothesis portion 212 outputs, to the correlation characteristic amount calculation portion 213-1 that is provided to correspond to a postulated first pixel array pattern, the correlation pattern information corresponding to the first pixel array pattern. The correlation pattern information corresponding to the first pixel array pattern is information indicating a high degree of correlation in the correlation characteristic amount when the RAW image data generated by the image sensor of the first pixel array pattern is input. For example, the pixel array pattern hypothesis portion 212 takes, as the correlation pattern information, pattern information relating to a pixel array of pixels of the same type in the first pixel array pattern. The pixel array pattern hypothesis portion 212 outputs, to the correlation characteristic amount calculation portion 213-2 that is set to correspond to a postulated second pixel array pattern, the correlation pattern information corresponding to the second pixel array pattern. The correlation pattern information corresponding to the second pixel array pattern is information indicating a high degree of correlation in the correlation characteristic amount when the RAW image data generated by the image sensor of the second pixel array pattern is input. For example, the pixel array pattern hypothesis portion 212 takes, as the correlation pattern information, pattern information relating to a pixel array of pixels of the same type in the second pixel array pattern. Similarly, the pixel array pattern hypothesis portion 212 generates and outputs the correlation pattern information corresponding to the postulated pixel array patterns to the correlation characteristic amount calculation portions 213-3 to 213-$n$.

The correlation characteristic amount calculation portion 213-1 performs a correlation calculation using the input RAW image, based on the correlation pattern information supplied from the pixel array pattern hypothesis portion 212, and thus calculates the correlation characteristic amount. The correlation characteristic amount calculation portion 213-1 outputs the calculated correlation characteristic amount to the pixel array pattern hypothesis verification portion 214.

Similarly, the correlation characteristic amount calculation portions 213-2 to 213-$n$ perform the correlation calculation using the input RAW image, based on the correlation pattern information supplied from the pixel array pattern hypothesis portion 212, and thus calculate the correlation characteristic amounts. The correlation characteristic amount calculation portions 213-2 to 213-$n$ output the calculated correlation characteristic amounts to the pixel array pattern hypothesis verification portion 214.

Based on the correlation characteristic amounts supplied from the correlation characteristic amount calculation portions 213-1 to 213-$n$, the pixel array pattern hypothesis verification portion 214 determines which of the correlation characteristic amount calculation portions has calculated the correlation characteristic amount indicating the highest degree of correlation. In addition, the pixel array pattern hypothesis verification portion 214 estimates, as the pixel array pattern of the image sensor being used to generate the input RAW image data, the pixel array pattern corresponding to the correlation characteristic amount calculation portion that calculated the correlation pattern information indicating the highest degree of correlation. The pixel array pattern hypothesis verification portion 214 outputs the estimation result of the pixel array pattern to the processing portion 30, as the characteristic information of the image sensor.

Note that, in the pixel array pattern estimation portion 21, the estimation of the pixel array pattern may be performed using an absolute value or a relative value that indicate the degree of correlation, irrespective of a correlation factor.

Figure 3:
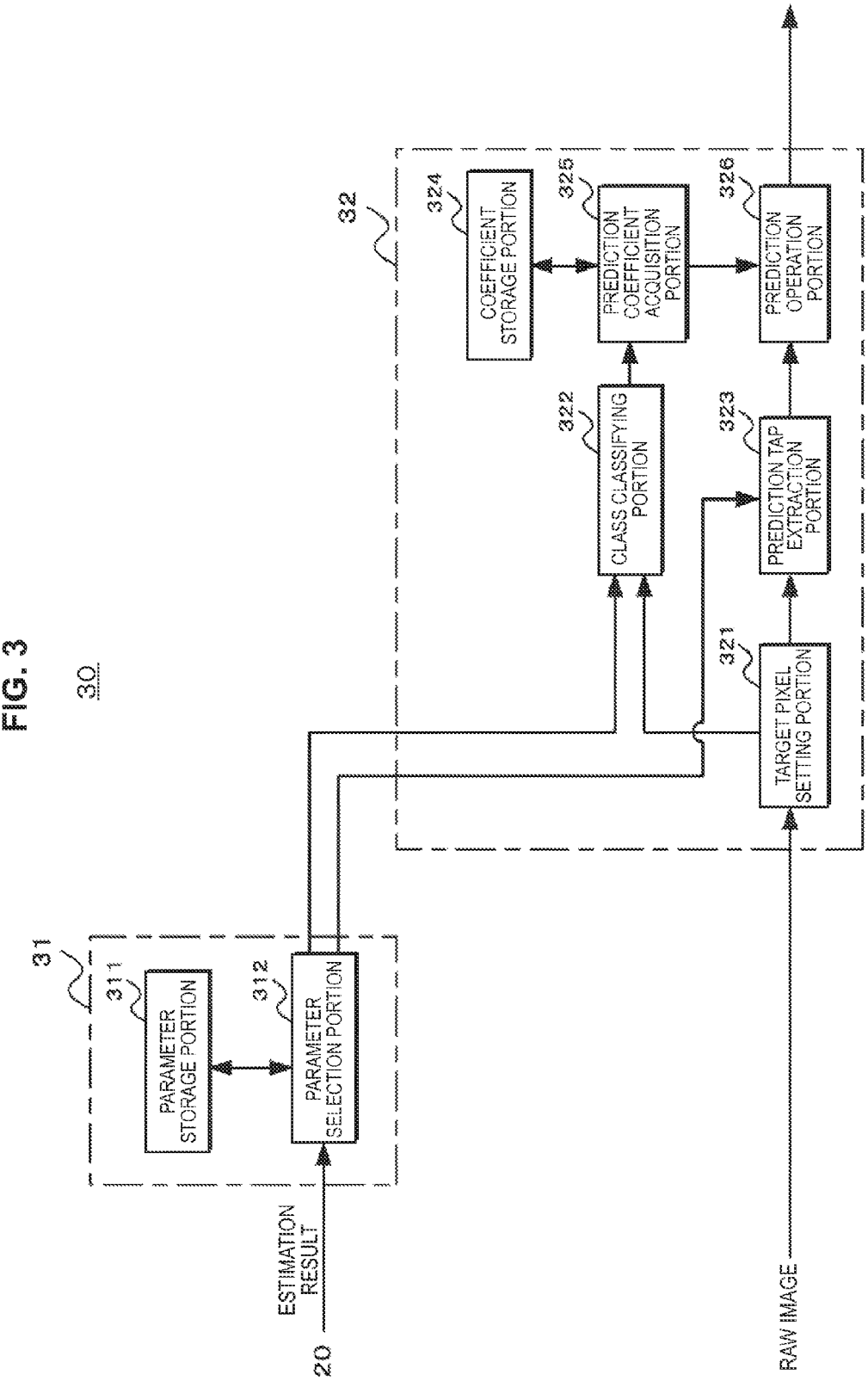
FIG. 3 is a diagram showing an example of a configuration of an image quality improvement parameter setting portion and an image quality improvement processing portion.

FIG. 3 shows an example of a configuration of the image quality improvement parameter setting portion 31 and the image quality improvement processing portion 32. The image quality improvement parameter setting portion 31 includes a parameter storage portion 311 and a parameter selection portion 312.

The parameter storage portion 311 stores, in advance, image quality improvement parameters, which are used to perform image quality improvement processing for each type of the image sensor. The parameter selection portion 312 reads out, from the parameter storage portion 311, the image quality improvement parameters corresponding to the characteristic information generated by the characteristic estimation portion 20, and outputs the read image quality improvement parameters to the image quality improvement processing portion 32.

The image quality improvement processing portion 32 shown in FIG. 3 is exemplified as having a configuration for a case in which image quality improvement processing of an image is performed using a prediction coefficient that is learnt in advance, for example. The image quality improvement processing portion 32 includes a target pixel setting portion 321, a class classifying portion 322, a prediction tap extraction portion 323, a coefficient storage portion 324, a prediction coefficient acquisition portion 325 and a prediction operation portion 326.

The target pixel setting portion 321 sequentially sets, as a target pixel, a given pixel that is a prediction target, namely, a given pixel on which image quality improvement processing is to be performed. The target pixel setting portion 321 outputs a pixel position of the set target pixel to the class classifying portion 322. Further, the target pixel setting portion 321 outputs the input RAW image and the target pixel position to the prediction tap extraction portion 323.

In accordance with the pixel position of the target pixel set by the target pixel setting portion 321 and the image quality improvement parameters set by the image quality improvement parameter setting portion 31, the class classifying portion 322 classifies the target pixel to a class that is associated with a prediction coefficient in the coefficient storage portion 34, which will be explained later. Then, the class classifying portion 322 outputs a class code indicating the classified class to the prediction coefficient acquisition portion 325.

Prediction coefficients, which are acquired through learning processing, are stored in the coefficient storage portion 324, for each class in accordance with the pixel position. For example, the coefficient storage portion 324 reads out the prediction coefficient stored in association with the class code specified by the prediction coefficient acquisition portion 325, and outputs the prediction coefficient to the prediction coefficient acquisition portion 325.

The prediction coefficient acquisition portion 325 acquires, from the coefficient storage portion 324, the prediction coefficient corresponding to the class code input from the class classifying portion 322, and outputs the acquired prediction coefficient to the prediction operation portion 326.

The prediction tap extraction portion 323 extracts, as a prediction tap, a plurality of pixels from the RAW image that are in the vicinity of the position of the target pixel input from the target pixel setting portion 321. The prediction tap extraction portion 323 outputs the extracted prediction tap to the prediction operation portion 326. Further, the prediction tap extraction portion 323 may set a layout and a number of prediction taps in accordance with the image quality improvement parameters.

The prediction operation portion 326 calculates a prediction value that is equivalent to a pixel value of the target pixel, by performing, for example, linear combination of each of the pixel values of the prediction taps supplied from the prediction tap extraction portion 323 and each of the coefficient values of the prediction coefficients input from the prediction coefficient acquisition portion 325.

By performing the calculation of the prediction values for all the pixels of the RAW image in this manner, it is possible to generate image data with enhanced image quality while taking into account the estimated characteristics of the image sensor.

Further, achieving enhanced quality of images is not limited to image quality improvement processing using a prediction coefficient. For example, the image processing device 10 may perform filter processing by setting a filter coefficient or a filter tap number in accordance with image quality improvement parameters, and may then enhance the quality of the image.

1.2 Operations of Image Processing Device

Figure 4:
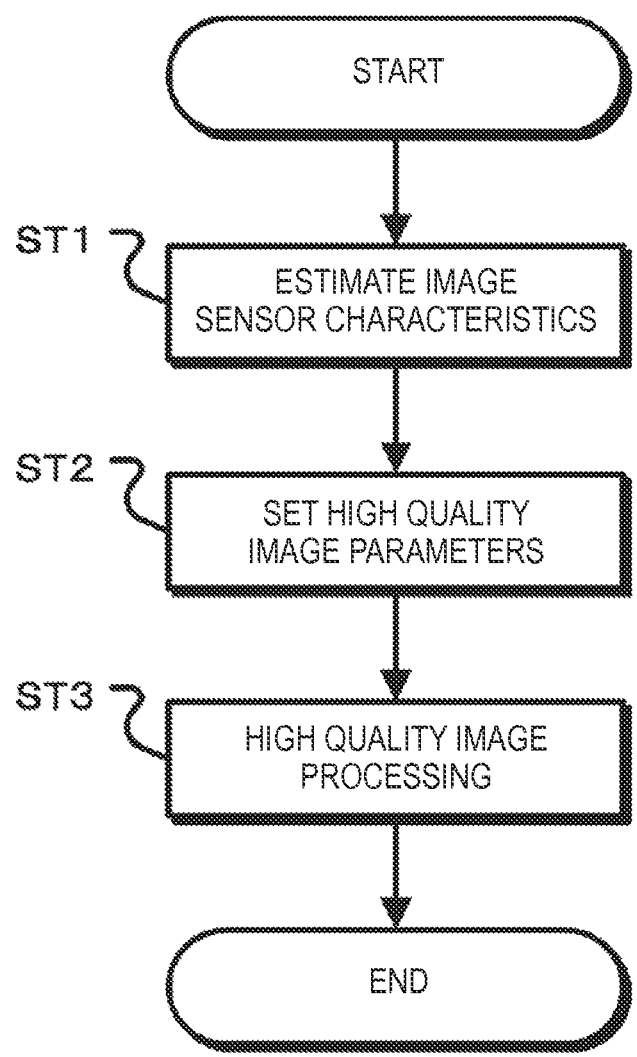
FIG. 4 is a flowchart showing operations of the image processing device according to the first embodiment.

FIG. 4 is a flowchart showing operations of the image processing device 10 according to the first embodiment. At step ST1, the image processing device 10 performs image sensor characteristic estimation. The image processing device 10 performs the image sensor characteristic estimation, estimates the pixel array pattern of the image sensor and advances to step ST2.

At step ST2, the image processing device 10 performs image quality improvement parameter setting. The image processing device 10 sets the image quality improvement parameters corresponding to the image sensor of the estimated pixel array pattern, and advances to step ST3.

At step ST3, the image processing device 10 performs image quality improvement processing. By using the set parameters, the image processing device 10 performs the image quality improvement processing in accordance with the estimated image sensor.

Figure 5:
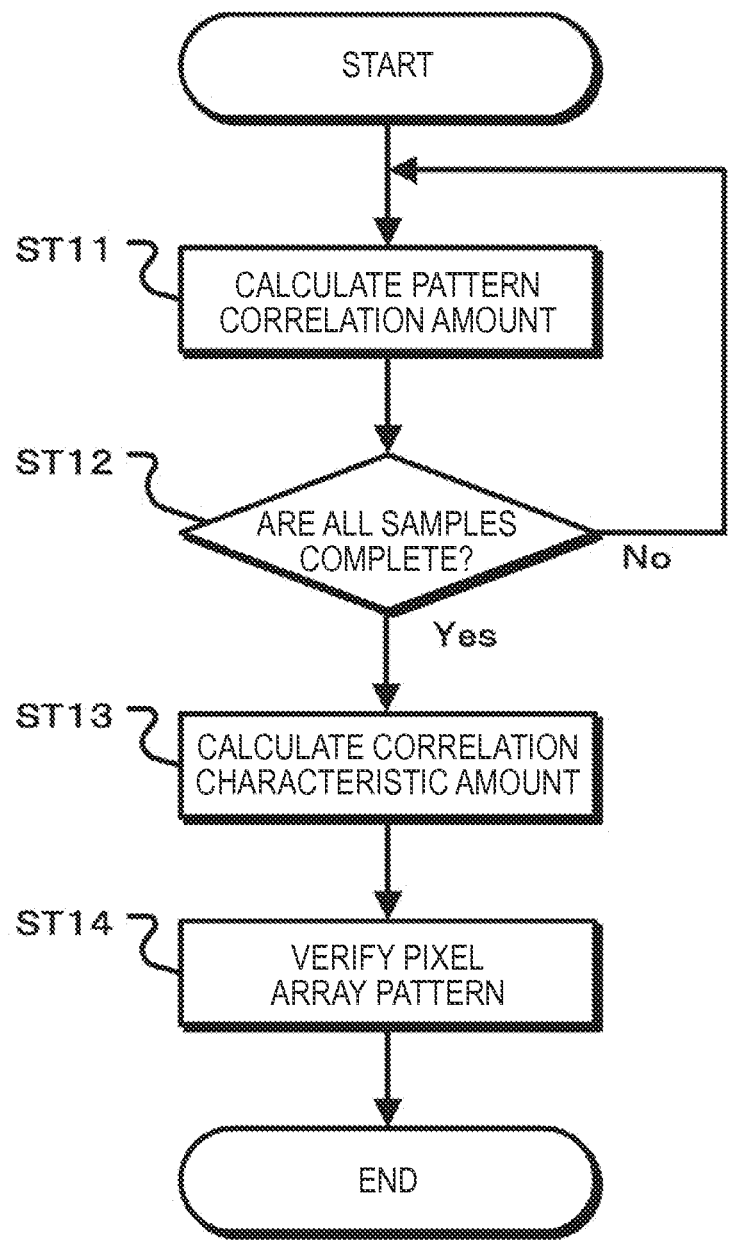
FIG. 5 is a flowchart exemplifying an operation to estimate a pixel array pattern.

FIG. 5 is a flowchart showing an example of an operation to estimate the pixel array pattern. At step ST11, the image processing device 10 performs calculation of a pattern correlation amount. The image processing device 10 calculates, based on correlation pattern information, correlation values relating to a pixel array of pixels of the same type in the pixel array pattern with respect to each of the postulated pixel array patterns. Further, the image processing device 10 performs the calculation of the correlation values in units of pixel size of the pixel array pattern. The image processing device 10 accumulates the calculated correlation values and advances to step ST12.

At step ST12, the image processing device 10 determines whether or not it is the end of all the samples. When the calculation of the pattern correlation amount for a set image range has not been completed, the image processing device 10 moves, in units of pixel size of the pixel array pattern, an image region that is used to calculate the pattern correlation amount, and returns to step ST11. Further, when the calculation of the pattern correlation amount for the set image range has been completed, the image processing device 10 advances to step ST13.

At step ST13, the image processing device 10 calculates the correlation characteristic amount. For each of the postulated pixel array patterns, the image processing device 10 calculates the correlation characteristic amount from the correlation values relating to the pixel array for the same type of pixels calculated for the pixel array pattern, and advances to step ST14.

At step ST14, verification of the pixel array pattern is performed. Based on the correlation characteristic amount calculated for each of the postulated pixel array patterns, the image processing device 10 determines which of the pixel array patterns has the highest degree of correlation, and the determined pixel array pattern is estimated as the pixel array pattern of the image sensor used to generate the image.

Next, a specific example will be shown of the estimation of the pixel array pattern. FIG. 6 shows an example of a pixel array pattern of an image sensor used to generate RAW image data. FIG. 6(1) is a Bayer Array, FIG. 6(2) is a pixel array of a clear bit CMOS sensor (registered trademark) and FIG. 6(3) is an RGBW pixel array, in which white component pixels have been added to the RGB primary colors. FIG. 6(4) is a so-called HDR pixel array that is used to generate high dynamic range image data. Note that in FIG. 6, "R" indicates red component pixels, "G" indicates green component pixels, "B" indicates blue component pixels, "W" indicates white component pixels and "LG" indicates green component pixels having a long charge storage time. Further, the pixel array of the image sensor is not limited to the pixel arrays shown in FIG. 6.

Assuming that the pixel array of the image sensor has a pattern regularity such as those shown in FIG. 6, the pixel array pattern hypothesis portion 212 generates the correlation pattern information in order to calculate the correlation characteristic amount with respect to the pixel array pattern, for each of the pixel array patterns. For example, in the case of the Bayer array shown in FIG. 6(1), the three hypotheses given below are established. Thus, the pixel array pattern hypothesis portion 212 generates, as the correlation pattern information, pattern information to calculate the correlation value for each of the three hypotheses.

Hypothesis 1 Within a block of 4×4 pixels, there is a high degree of spatial correlation between diagonally adjacent green component pixels.

Hypothesis 2 Within a block of 4×4 pixels, there is a high degree of spatial correlation between four red component pixels.

Hypothesis 3 Within a block of 4×4 pixels, there is a high degree of spatial correlation between four blue component pixels.

Similarly for the other pixel array patterns also, the pixel array pattern hypothesis portion 212 generates, as the correlation pattern information, the pattern information to calculate the correlation values, for each hypothesis that is established with respect to the pattern regularity of the pixel array.

The correlation characteristic amount calculation portions 213-1 to 213-$n$ perform the correlation calculation based on the correlation pattern information supplied from the pixel array pattern hypothesis portion 212. The correlation calculation calculates a correlation value r, based on Expression (1) or Expression (2), for example. In Expression (1) and Expression (2), "sample" indicates a number of pairs of pixels used in the correlation calculation.

$$r = \frac{\sum_{i=1}^{sample} (x_i - \bar{x}) \cdot (y_i - \bar{y})}{\sqrt{\sum_{i=1}^{sample} (x_i - \bar{x})^2} \sqrt{\sum_{i=1}^{sample} (y_i - \bar{y})^2}} \quad (1)$$

$$r = \frac{\sum_{i=1}^{sample} |x_i - y_i|}{sample} \quad (2)$$

Here, when the pixel array is the Bayer array, as shown in FIG. 7, based on the above-described Hypothesis 1, operation of Expression (1) or Expression (2) is performed while taking pairs of pixels (x, y) of the green component pixels as four pairs (P1, P6), (P3, P8), (P9, P14) and (P11, P16), for example. Further, based on the above-described Hypothesis 2 that is based on the pattern information, operation of Expression (1) or Expression (2) is performed while taking pairs of pixels (x, y) of the red component pixels as four pairs (P5, P7), (P5, P13), (P7, P15) and (P13, P15), for example. In addition, based on the above-described Hypothesis 3, operation of Expression (1) or Expression (2) is performed while taking pairs of pixels (x, y) of the blue component pixels as four pairs (P2, P4), (P2, P10), (P4, P12) and (P10, P12), for example. The pixel array pattern hypothesis portion 212 outputs the pattern information indicating these types of pairs of pixels (x, y) to the correlation characteristic amount calculation portion, as the correlation pattern information. Based on the correlation pattern information, the correlation characteristic amount calculation portion calculates the correlation values relating to the pixel array for the pixels of the same type in the pixel array pattern. Additionally, the correlation characteristic amount calculation portion calculates the correlation characteristic amount from the calculated correlation values. For example, the correlation characteristic amount calculation portion adds the calculated correlation values to obtain the correlation characteristic amount. Further, the correlation characteristic amount calculation portion may perform weighting in accordance with the color component etc. when adding the correlation values. The correlation characteristic amount that is calculated in this manner is a value that indicates a high degree of correlation when the pixel array of the image sensor used to generate the image is the Bayer array, and a value that indicates a low degree of correlation when it is an array different to the Bayer array.

Thus, from the correlation characteristic amount calculated for each of the postulated pixel array patterns, it is possible to estimate the pixel array of the image sensor that is used to generate the image. Further, using the estimation result of the pixel array pattern of the image sensor, it is possible to perform the image quality improvement processing in accordance with the pixel array pattern.

As described above, in the first embodiment, the characteristic estimation portion 20 estimates the characteristics of the image sensor based on the RAW image data that is the image information obtained from the image sensor, and also acquires the characteristic information that is included in the RAW image data. Further, the image quality improvement processing portion 32 uses the estimation result and the image quality improvement parameters corresponding to the characteristic information to perform the image quality improvement processing on the RAW image. As a result, the image processing device 10 can perform optimal image processing, such as image quality improvement processing, on the RAW image generated by various types of the image sensor in accordance with the characteristics of the image sensor. Furthermore, it is not necessary to develop an image processing device for each type of the image sensor and thus development periods can be shortened and development costs can be reduced.

Further, the pixel array pattern estimation portion 21 may increase the number of pixel array patterns that can be estimated, by generating correlation parameter information in accordance with parameters supplied from an external source etc. In addition, the image processing device 10 may be adapted such that it can update the pixel array patterns that can be estimated by the pixel array pattern estimation portion 21, by performing software updates and the like. By adopting this type of configuration, it is possible to increase the general-purpose properties of the image processing device.

2. Second Embodiment

Above, in the first embodiment, the case is explained in which the pixel array pattern is estimated. However, in comparison to the case in which the image quality improvement processing is performed after estimating the pixel array pattern only, it is possible to perform image quality improvement processing with an even higher level of correspondence to the characteristics of the image sensor, by estimating which of the pixels is a pixel of what type of color etc.

Here, in a second embodiment, an example will be explained in which, with respect to the estimation of the pixel array pattern and to the estimated pixel array pattern, it is estimated which of the pixels is what type of color and so on. Additionally, in the second embodiment, a configuration and operations will be explained in which the estimation of the pixel array pattern can be performed more accurately in comparison to that of the first embodiment.

2.1 Configuration of Image Processing Device

Similarly to the image processing device 10 of the first embodiment shown in FIG. 1, the image processing device 10 according to the second embodiment is provided with the characteristic estimation portion 20, the image quality improvement parameter setting portion 31 and the image quality improvement processing portion 32.

The characteristic estimation portion 20 estimates the characteristics of the image sensor based on the RAW image data that is the image information acquired from the image sensor.

The characteristic estimation portion 20 outputs the estimation result to the processing portion 30.

The image quality improvement parameter setting portion 31 of the processing portion 30 stores, in advance, image quality improvement parameters, which are used to perform image quality improvement processing for each type of the image sensor. Based on the estimation result of the characteristic estimation portion 20, the image quality improvement parameter setting portion 31 selects the image quality improvement parameters corresponding to the estimated image sensor, and outputs the selected parameters to the image quality improvement processing portion 32.

The image quality improvement processing portion 32 uses the image quality improvement parameters supplied from the image quality improvement parameter setting portion 31 and performs the image quality improvement processing on the RAW image that is supplied from the image sensor.

Figure 8:
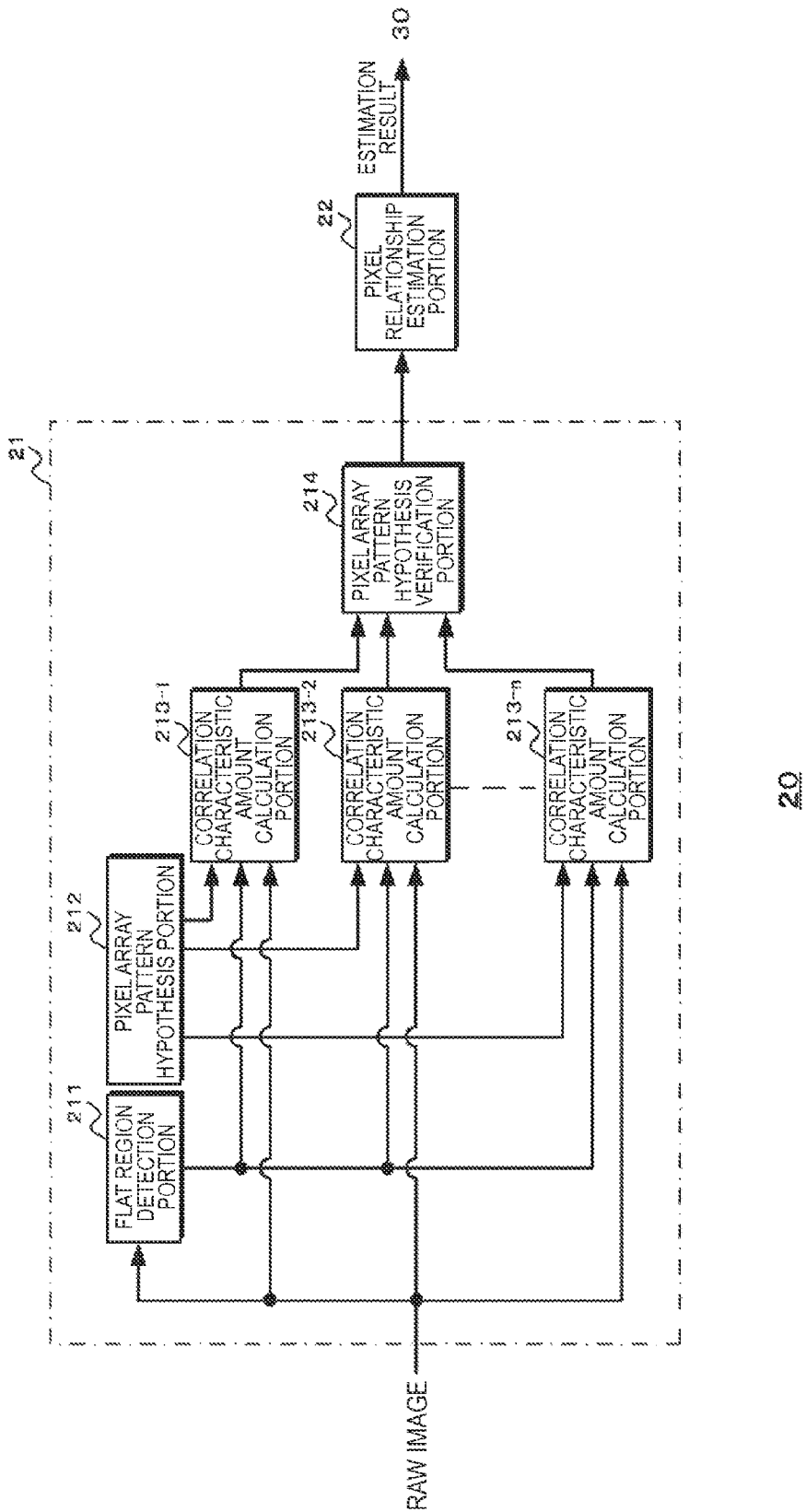
FIG. 8 is a diagram showing a configuration of the characteristic estimation portion according to a second embodiment.

FIG. 8 shows the configuration of the characteristic estimation portion 20 according to the second embodiment. The characteristic estimation portion 20 is provided with the pixel array pattern estimation portion 21, which estimates the pixel array pattern of the image sensor that is used to generate the RAW image data, and a pixel relationship estimation portion 22, which estimates which of the pixels is a pixel of what type of color etc.

The pixel array pattern estimation portion 21 is provided with a flat region detection portion 211, the pixel array pattern hypothesis portion 212, the correlation characteristic amount calculation portions 213-1 to 213-$n$ and the pixel array pattern hypothesis verification portion 214.

The flat region detection portion 211 detects a flat region in the RAW image. In the image sensor, pixel values of pixels of the same type have a high degree of correlation in the flat region in the image, and it is easy to grasp in what manner the pixels of the same type are spatially distributed. As a result, the flat region detection portion 211 detects the flat region in the RAW image, and outputs a detection result to the correlation characteristic amount calculation portions 213-1 to 213-$n$.

As described above, the pixel array pattern hypothesis portion 212 generates the correlation pattern information in accordance with the pixel array pattern, in order to calculate the correlation characteristic amount for each of the pixel array patterns postulated in advance. The pixel array pattern hypothesis portion 212 outputs the generated correlation pattern information to the correlation characteristic amount calculation portions 213-1 to 213-$n$. The pixel array pattern hypothesis portion 212 outputs, to the correlation characteristic amount calculation portion 213-1 that is provided to correspond to the postulated first pixel array pattern, the correlation pattern information corresponding to the first pixel array pattern. The correlation pattern information corresponding to the first pixel array pattern is the information indicating a high degree of correlation in the correlation characteristic amount when the RAW image data generated by the image sensor of the first pixel array pattern is input. For example, the pixel array pattern hypothesis portion 212 takes, as the correlation pattern information, the pattern information relating to a pixel array of pixels of the same type in the first pixel array pattern. Similarly, the pixel array pattern hypothesis portion 212 generates and outputs the correlation pattern information corresponding to the postulated pixel array patterns, to the other correlation characteristic amount calculation portions 213-2 to 213-$n$.

Based on the correlation pattern information supplied from the pixel array pattern hypothesis portion 212, the correlation characteristic amount calculation portion 213-1 performs a correlation calculation using an image of a flat region detected by the flat region detection portion 211 in the input RAW image, and thus calculates a correlation characteristic amount. The correlation characteristic amount calculation portion 213-1 outputs the calculated correlation characteristic amount to the pixel array pattern hypothesis verification portion 214.

Similarly, based on the correlation pattern information supplied from the pixel array pattern hypothesis portion 212, the correlation characteristic amount calculation portions 213-2 to 213-n perform a correlation calculation using an image of a flat region detected by the flat region detection portion 211 in the input RAW image, and thus calculate correlation characteristic amounts. The correlation characteristic amount calculation portions 213-2 to 213-n output the calculated correlation characteristic amounts to the pixel array pattern hypothesis verification portion 214.

Based on the correlation characteristic amounts supplied from the correlation characteristic amount calculation portions 213-1 to 213-n, the pixel array pattern hypothesis verification portion 214 determines which of the correlation characteristic amount calculation portions has calculated the correlation characteristic amount indicating the highest degree of correlation. In addition, the pixel array pattern hypothesis verification portion 214 estimates, as the pixel array pattern of the image sensor used to generate the input RAW image data, the pixel array pattern corresponding to the correlation characteristic amount calculation portion that calculated the correlation characteristic amount indicating the highest degree of correlation. The pixel array pattern hypothesis verification portion 214 outputs the estimation result of the pixel array pattern to the pixel relationship estimation portion 22.

The pixel relationship estimation portion 22 estimates, with respect to the pixel array pattern estimated by the pixel array pattern estimation portion 21, relationships between pixels, such as which of the pixels is a pixel of what type of color and so on. The pixel relationship estimation portion 22 outputs a pixel relationship estimation result and the pixel array pattern estimated by the pixel array pattern estimation portion 21 to the processing portion 30, as the characteristic information of the image sensor used to generate the input RAW image data.

As shown in the above-described FIG. 3, the image quality improvement parameter setting portion 31 of the processing portion 30 is provided with the parameter storage portion 311 and the parameter selection portion 312.

The parameter storage portion 311 stores, in advance, image quality improvement parameters that are used to perform the image quality improvement processing for each type of the image sensor. The parameter selection portion 312 reads out, from the parameter storage portion 311, the image quality improvement parameters corresponding to the characteristic information generated by the characteristic estimation portion 20, and outputs the image quality improvement parameters to the image quality improvement processing portion 32. For example, the parameter selection portion 312 reads out, from the parameter storage portion 311, the image quality improvement parameters corresponding to the pixel array pattern and the pixel relationships estimated by the characteristic estimation portion 20, and outputs the image quality improvement parameters to the image quality improvement processing portion 32. As described above with reference to FIG. 3, the image quality improvement processing portion 32 performs the class classifying and prediction value calculations similarly to the first embodiment, in accordance with the image quality improvement parameters set in the image quality improvement parameter setting portion 31. The image quality improvement processing portion 32 then generates image data with enhanced image quality.

2.2 Operations of Image Processing Device

As shown in FIG. 4, the image processing device 10 according to the second embodiment performs image sensor characteristic estimation, image quality improvement parameter setting and image quality improvement processing.

Figure 9:
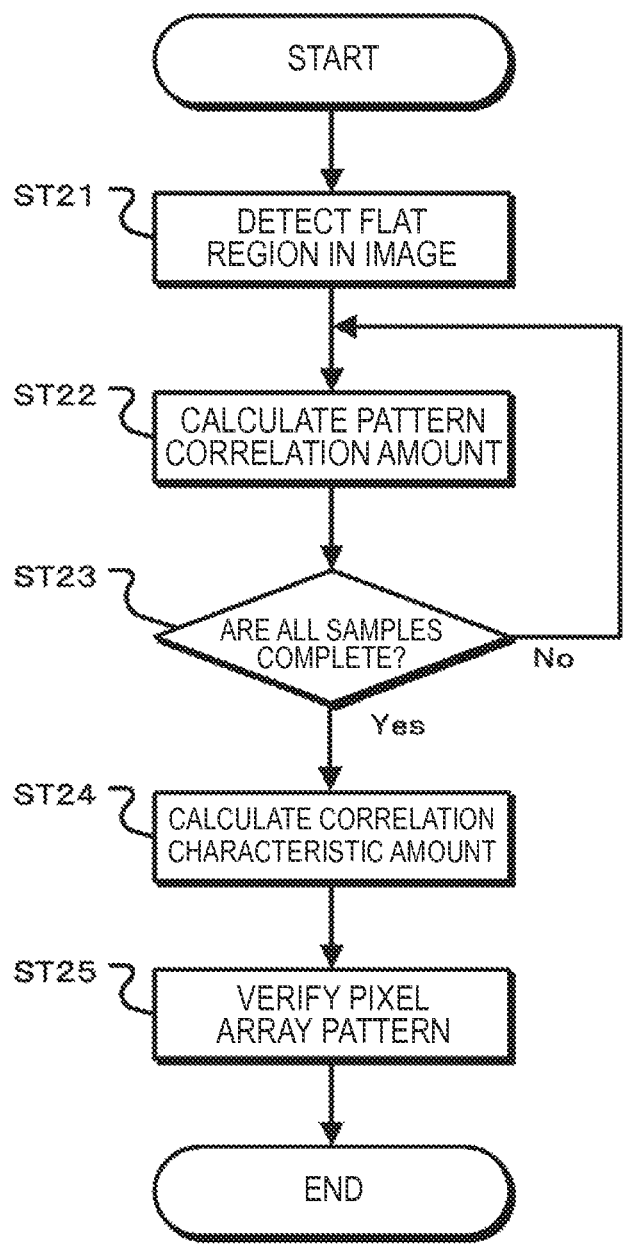
FIG. 9 is a flowchart exemplifying an operation to estimate a pixel array pattern.
Figure 10:
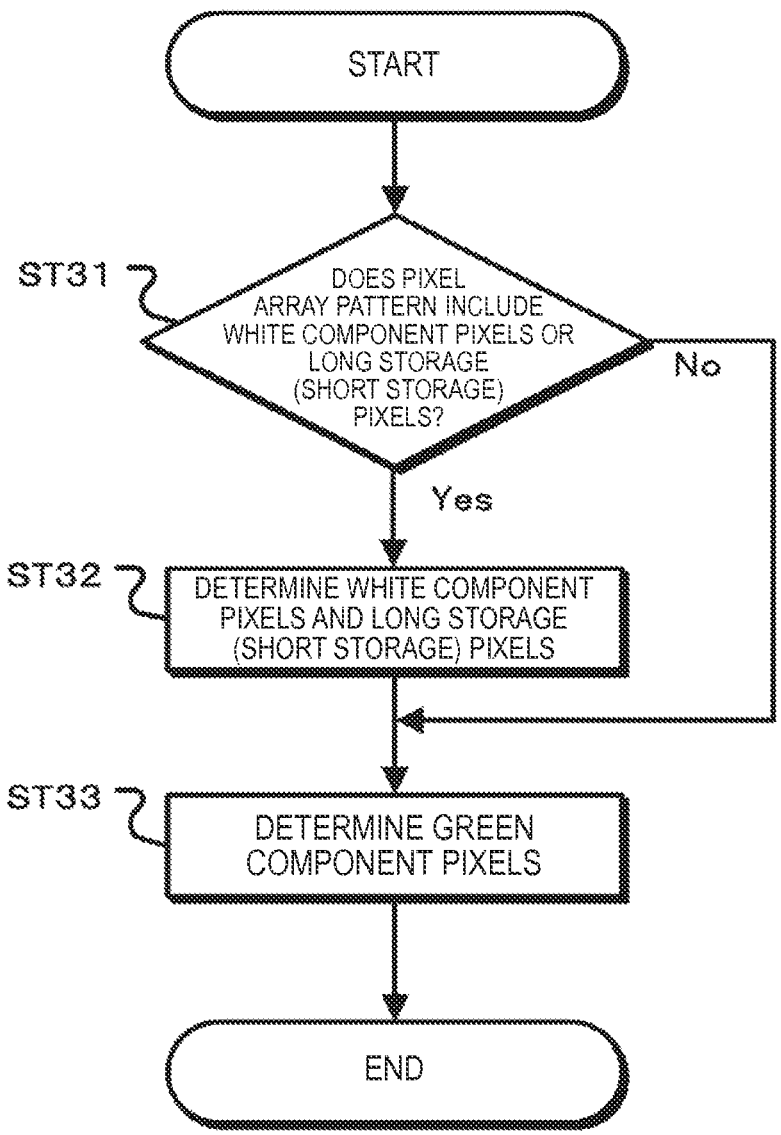
FIG. 10 is a flowchart exemplifying an operation to estimate pixel relationships.

In the image sensor characteristic estimation, the estimation operation of the pixel array pattern shown in FIG. 9 and the estimation operation of the pixel relationships shown in FIG. 10 are performed.

As shown in FIG. 9, at step ST21, the image processing device 10 performs detection of a flat region in the image. The image processing device 10 detects the flat region in the input RAW image and then advances to step ST22.

At step ST22, the image processing device 10 performs calculation of the pattern correlation amount. The image processing device 10 uses an image of the flat region to calculate the correlation values relating to the pixel array for the same type of pixels in the pixel array pattern, based on the correlation pattern information. This calculation is performed for each of the postulated pixel array patterns. Further, the image processing device 10 performs the calculation of the correlation values in units of pixel size of the pixel array pattern. The image processing device 10 accumulates the calculated correlation values and advances to step ST23.

At step ST23, the image processing device 10 determines whether or not it is the end of all the samples. When the calculation of the pattern correlation amount for the flat region in the image has not been completed, the image processing device 10 moves an image region that is used to calculate the pattern correlation amount within the flat region in the image, in units of pixel size of the pixel array pattern. The image processing device 10 then returns to step ST22. When the calculation of the pattern correlation amount for the flat region in the image has been completed, the image processing device 10 advances to step ST24.

At step ST24, the image processing device 10 calculates the correlation characteristic amount. For each of the postulated pixel array patterns, the image processing device 10 calculates the correlation characteristic amount from the correlation values relating to the pixel array for the same type of pixels calculated for the pixel array pattern, and advances to step ST25.

At step ST25, verification of the pixel array pattern is performed. Based on the correlation characteristic amount calculated for each of the postulated pixel array patterns, the image processing device 10 determines which of the pixel array patterns has the highest degree of correlation, and the determined pixel array pattern is estimated as the pixel array pattern of the image sensor used to generate the image.

FIG. 10 exemplifies a flowchart showing an operation to estimate pixel relationships. At step ST31, the image processing device 10 determines whether or not the pixel array pattern includes white component pixels or long storage (short storage) pixels. Note here that long storage pixels are pixels having a longer charge storage time than the other pixels, and the short storage pixels are pixels having a shorter charge storage time than the other pixels. When it is estimated, by the pixel array pattern estimation, that the pixel array pattern of the image sensor is the pixel array pattern that includes the white component pixels or the long storage (short storage) pixels, the image processing device 10 advances to step ST32. When it is estimated that the pixel array pattern is not the above-described pixel array pattern, the image processing device 10 advances to step ST33.

At step ST32, the image processing device 10 performs determination of the white component pixels and the long storage (short storage) pixels. In the image processing device 10, it is considered that the average of the pixel values of the white component pixels is higher than the average of the pixel values of other color component pixels. Further, it is considered that the average of the pixel values of the long storage pixels is higher than the average of the pixel values of the other pixels. In addition, it is considered that the average of the pixel values of the short storage pixels is lower than the average of the pixel values of the other pixels. As a result, the white component pixels and the long storage (short storage) pixels can be determined based on the pixel value average for each pixel type. The image processing device 10 performs the determination of the white component pixels and the long storage (short storage) pixels, and then advances to step ST33.

At step ST33, the image processing device 10 performs determination of the green component pixels. For example, if it is an image of a natural scene, it can be considered that there is a tendency for the pixel values of the green component pixels to be spread over a wider range in comparison to the red component pixels and the blue component pixels. Thus, for the estimated pixel array pattern, based on the pixel values of the same type of pixels, the image processing device 10 generates a pixel value histogram, namely, a histogram showing the pixel values as the frequency of the number of pixels in a data range. The image processing device 10 determines the green component pixels from the distribution of the generated histogram.

By performing this type of processing, the image processing device 10 is able to determine the green component pixels, the white component pixels and the long storage (short storage) pixels in the estimated pixel array pattern.

Next, an operation to detect a flat region in the image, which is performed in the estimation of the pixel array pattern, will be explained. In the detection of the flat region in the image, a pixel value average is calculated of a specified area centering on the target pixel, for example, and the flat region in the image is taken as an area in which the amount of spatial variation is small. More specifically, a target pixel i is taken as a reference, and an average value AVEi is calculated from pixel values vj (j=1 to M) of a number of surrounding pixels M, based on Expression (3).

Further, using an average value AVEj (j=1 to N) that is calculated for each of a number of surrounding pixels N when the target pixel i is taken as the reference, a distribution VARi of the average value AVEi calculated for the target pixel i is calculated based on Expression (4). An area in which the calculated distribution VARi is smaller than a specified value is determined to be the flat region in the image.

$$AVE_i = \frac{1}{M}\sum_{j=1}^{M} v_j \quad (3)$$

$$VAR_i = \frac{1}{N}\sum_{j=1}^{N} \left(AVE_j - \overline{AVE}\right)^2 \quad (4)$$

Further, the detection of the flat region in the image can be performed using a histogram of the pixel values inside the region. For example, when the image is flat, the pixel values of the pixels of each color are substantially equal to each other, and thus peaks in the histogram occur in accordance with the type of the pixel. As a result, it is possible to detect the flat region in the image based on the number of peaks and the peak levels. In addition, the detection of the flat region in the image may detect not only the region, but may also set a level of reliability of the detection result in accordance with the degree of flatness. For example, the distribution VARi is used as the degree of flatness. Further, when the flat region in the image is detected using the histogram, the peak levels etc. may also be used.

In the estimation of the pixel array pattern, the above-described calculation of the pattern correlation amount, calculation of the correlation characteristic amount and verification of the pixel array pattern are performed using the image of the detected flat region. By using the image of the flat region, in which the correlation between the pixel values for the pixels of the same type is high, in this way, it becomes possible to accurately estimate the pixel array pattern.

By performing the estimation of the pixel array and the estimation of the pixel relationships in this manner, it becomes possible to determine what type of image sensor of the pixel array is used to generate the RAW image, and to determine, for each of the pixels of the RAW image, which of the pixels corresponds to which of the component pixels in the estimated pixel array.

As described above, similarly to the first embodiment, the characteristic estimation portion 20 of the second embodiment estimates the characteristics of the image sensor based on the RAW image data that is the image information obtained from the image sensor, and acquires the characteristic information that is included in the RAW image data. Further, the characteristic estimation portion 20 estimates relationships between the pixels, such as which of the pixels is a pixel of which type of color and so on. Additionally, the image quality improvement processing portion 32 uses the image quality improvement parameters corresponding to the estimation result and the characteristic information to perform image quality improvement processing of the RAW image. As a result, similarly to the first embodiment, the image processing device 10 can perform optimal image processing, such as image quality improvement processing, corresponding to the characteristics of the image sensor on the RAW image that is generated by various types of the image sensor. Furthermore, as it is not necessary to develop the image processing device for each type of the image sensor, development periods can be shortened and development costs can be reduced. In addition, in the second embodiment, the image quality improvement processing is performed based not only on the estimation result of the pixel array pattern, but also on the estimation result of the pixel relationships. Thus, it is possible to perform image processing corresponding to the characteristics of the image sensor that is even more optimal than in the first embodiment.

Furthermore, in the second embodiment, the characteristic estimation portion 20 performs the estimation of the pixel array pattern based on the image of the flat region in the image, and thus, it is possible to accurately estimate the pixel array pattern.

In addition, the pixel array pattern estimation portion 21 may be adapted to be able to estimate even more pixel relationships, in accordance with parameters etc. supplied from an external source. Further, the image processing device 10 may be adapted to be able to update, through software updates and the like, the pixel array patterns and the pixel relationships that can be estimated by the characteristic estimation portion 20. By adopting this kind of configuration, it is possible to enhance the general purpose properties of the image processing device.

3. Third Embodiment

In the first and second embodiments, the explanation is given for cases in which the image quality improvement processing is performed based on the estimation result of the characteristics of the image sensor. However, processing using the estimation result of the characteristics is not limited to the image quality improvement processing. In a third embodiment, an explanation will be given for the image processing device 10 that performs various types of processing using the estimation result of the characteristics.

3.1 Configuration and Operations of Third Embodiment

Figure 11:
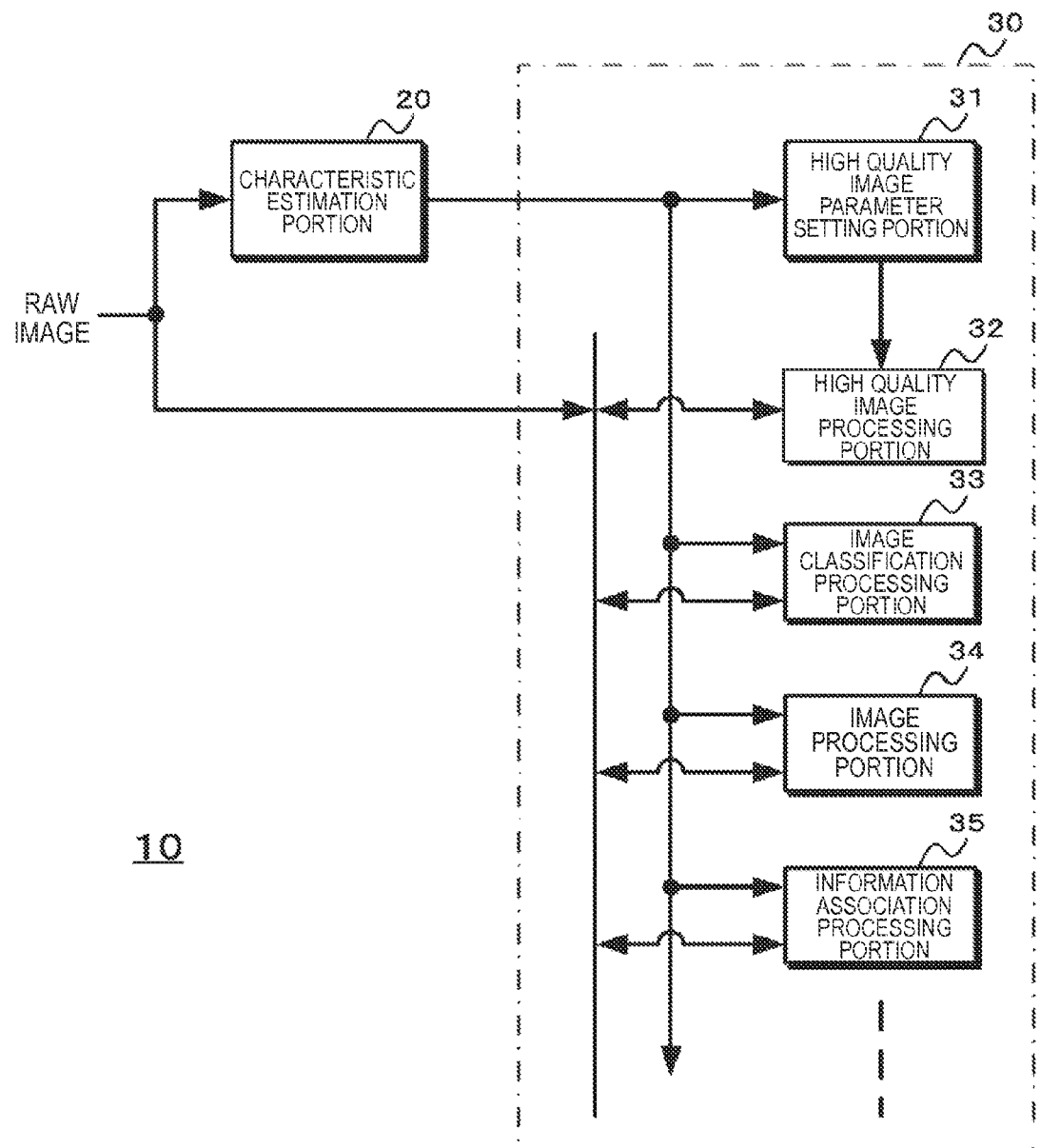
FIG. 11 is a diagram exemplifying a configuration of the image processing device according to a third embodiment.

FIG. 11 exemplifies a configuration of the image processing device 10 according to the third embodiment. The image processing device 10 according to the third embodiment is provided with the characteristic estimation portion 20 and the processing portion 30.

As described above, the characteristic estimation portion 20 estimates the pixel array pattern of the image sensor used to generate the RAW image data. For example, the characteristic estimation portion 20 performs the estimation of the pixel array pattern by determining which of pixel array patterns that are postulated in advance is most similar to the array of pixels having the same characteristics that are spatially close to each other. Further, the characteristic estimation portion 20 performs the estimation of the pixel array pattern and also performs the estimation of the relationships between pixels in the estimated pixel array pattern, such as which of the pixels is a pixel of which type of color and so on.

The processing portion 30 is provided not only with the image quality improvement parameter setting portion 31 and the image quality improvement processing portion 32 that are used to perform the image quality improvement processing, but is also provided with an image classification processing portion 33, an image processing portion 34 and an information association processing portion 35.

The image quality improvement parameter setting portion 31 selects the image quality improvement parameters corresponding to the image sensor estimated by the characteristic estimation portion 20. The image quality improvement processing portion 32 uses the selected image quality improvement parameters to perform the image quality improvement processing of the RAW image supplied from the image sensor.

The image classification processing portion 33 performs scene detection or face recognition, for example, on the RAW image, and then performs classification of the image based on a detection result or a recognition result. Further, when performing the scene detection or the face recognition, the image classification processing portion 33 uses the estimation result from the characteristic estimation portion 20.

The image processing portion 34 performs various types of treatment processing on the RAW image. Further, when performing the treatment processing, the image processing portion 34 uses the estimation results from the characteristic estimation portion 20.

When the characteristic information of the image sensor is not associated with the RAW image, the information association processing portion 35 performs association by using the estimation result from the characteristic estimation portion 20 as the characteristic information of the image sensor used to generate the RAW image. As the information association processing portion 35 associates the estimation result with the RAW image in this way, it becomes possible to use the estimation result when various types of processing are performed on the RAW image by another device.

Figure 12:
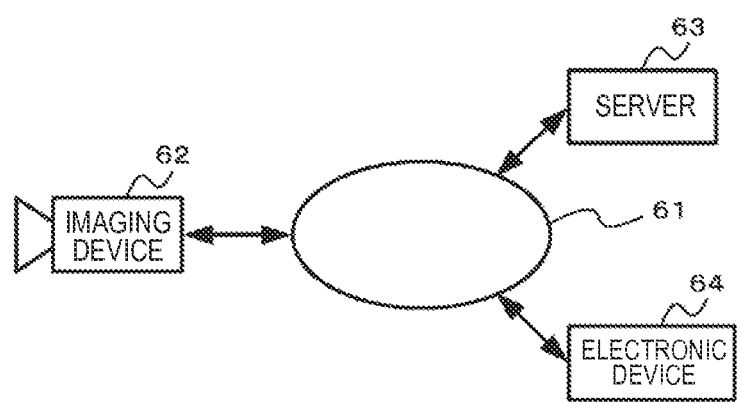
FIG. 12 is a diagram exemplifying a configuration of a system using the image processing device.

FIG. 12 exemplifies a system configuration using an image processing device. In a system 60, an imaging device 62 and a server 63 or an electronic device 64 are connected via a network 61, for example. The imaging device 62 outputs, to the server 63 or to the electronic device 64 via the wireless or wired network 61, RAW image data that is generated by performing an imaging operation.

The server 63 stores the RAW image data supplied from the imaging device 62. Further, in response to a request from the electronic device 64 or the like, the server 63 outputs requested RAW image data to the source of the request.

The electronic device 64 performs output processing to display a captured image etc., based on the RAW image data supplied from the imaging device 62 or on the RAW image data read out from the server 63.

In addition, the configuration of the above-described image processing device 10 is included in the server 63 or in the electronic device 64, and the imaging device 62 performs the estimation of the characteristics of the image sensor used to generate the RAW image data. Further, the server 63 and the electronic device 64 perform image processing etc. using the estimation result of the characteristics of the image sensor.

In this manner, according to the third embodiment, various types of processing, such as image quality improvement processing, can be performed by a server or an electronic device etc. on the RAW image data that is supplied from the imaging device 62, in accordance with the characteristics of the image sensor being used in the imaging device 62. In addition, it is not necessary to develop the image processing device for each type of the image sensor, and it is possible to deal with new characteristics of the image sensor through parameter settings or software updates and the like. Thus, the system is easily applicable to a server or to an electronic device and the like.

A series of processes described in the specification can be executed using hardware, software, or a combined configuration of both. When a process is executed using software, a program in which a process sequence is recorded is executed by being installed in a memory inside a computer which is incorporated into dedicated hardware. Alternatively, such execution is possible by installing a program in a general-purpose computer which can execute various processes.

For example, a program can be recorded in advance in hard disk or a ROM (Read Only Memory) as a recording medium. Alternatively, such a program can be temporarily or permanently stored (recorded) on a removable recording medium including a flexible disk, a CD-ROM (Compact Disc Read Only Memory), an MO (Magneto Optical) disc, a DVD (Digital Versatile Disc), a magnetic disk, a semiconductor memory card, or the like. Such a removable recording medium can be provided as so-called package software.

In addition, a program may be transferred to a computer in a wired or wireless manner via a network such as the Internet, a LAN (Local Area Network), or the like from a download side, in addition to being installed in a computer from a removable recording medium. The program transferred in that way can be received by a computer, and installed in a recording medium such as a built-in hard disk.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:
a characteristic estimation portion that, from one of image information obtained from an image sensor and information attached to the image information, estimates a characteristic of the image sensor that is used to generate the image information; and
   a processing portion that processes the image information in accordance with the characteristic of the image sensor estimated by the characteristic estimation portion.
(2) The image processing device according to (1), wherein
   the characteristic estimation portion includes a pixel array pattern estimation portion that estimates a pixel array pattern of the image sensor.
(3) The image processing device according to (2), wherein
   the pixel array pattern estimation portion determines which of pixel array patterns postulated in advance is most similar to an array of pixels that are spatially close and that have identical characteristics, and estimates a pixel array pattern of the image sensor that generates the image information.
(4) The image processing device according to (3), wherein
   the pixel array pattern estimation portion calculates a correlation characteristic amount with respect to a pixel array pattern for each of the pixel array patterns postulated in advance, and determines which pixel array pattern is most similar based on the calculated correlation characteristic amount.
(5) The image processing device according to any one of (2) to (4), further including:
   a flat region detection portion that detects a flat region in an image in the image information, wherein
   the pixel array pattern estimation portion calculates the correlation characteristic amount using image information of the flat region in the image detected by the flat region detection portion.
(6) The image processing device according to any one of (2) to (5), wherein
   the characteristic estimation portion includes a pixel relationship estimation portion that estimates a relationship between pixels in the estimated pixel array pattern.
(7) The image processing device according to (6), wherein
   the pixel relationship estimation portion determines different white component pixels and pixels having different charge storage times in the estimated pixel array pattern, based on a pixel value average.
(8) The image processing device according to (6) or (7), wherein
   the pixel relationship estimation portion determines green component a pixel in the estimated pixel array pattern, based on a pixel value histogram.
(9) The image processing device according to any one of (1) to (8), wherein
   the processing portion performs at least one of image quality improvement processing, image classification processing and image processing.
(10) The image processing device according to any one of (1) to (9), wherein
   the image information is RAW image data.

According to the image processing device, the image processing method, and a program of the present technology, characteristics of an image sensor are estimated from image information obtained from the image sensor, or from information attached to the image information, and image processing is performed in accordance with the characteristics of the estimated image sensor. As a result, the processing of the image information obtained from the image sensor can be performed in accordance with the characteristics of the image sensor used to generate the image information. Further, it is not necessary to develop an image processing device for each type of the image sensor, and thus a development period can be shortened and development costs can be reduced. Therefore, the present technology is applicable to a server that stores the RAW image data, or an electronic device or the like that performs various types of processing with the RAW image data.

The present disclosure contains subject matter related to that disclosed in Japanese Priority Patent Application JP 2012-111711 filed in the Japan Patent Office on May 15, 2012, the entire content of which is hereby incorporated by reference.

What is claimed is:

1. An image processing device comprising:
   a characteristic estimation portion that, from one of image information obtained from an image sensor and information attached to the image information, estimates a characteristic of the image sensor that is used to generate the image information; and
   a processing portion that processes the image information in accordance with the characteristic of the image sensor estimated by the characteristic estimation portion,
   wherein the characteristic estimation portion includes a pixel array pattern estimation portion that estimates a pixel array pattern of the image sensor, and
   wherein the characteristic estimation portion, the processing portion, and the pixel array pattern estimation portion are each implemented via at least one processor.

2. The image processing device according to claim 1, wherein
   the pixel array pattern estimation portion determines which of pixel array patterns postulated in advance is most similar to an array of pixels that are spatially close and that have identical characteristics, and estimates a pixel array pattern of the image sensor that generates the image information.

3. The image processing device according to claim 2, wherein
   the pixel array pattern estimation portion calculates a correlation characteristic amount with respect to a pixel array pattern for each of the pixel array patterns postulated in advance, and determines which pixel array pattern is most similar based on the calculated correlation characteristic amount.

4. The image processing device according to claim 3, further comprising:
   a flat region detection portion that detects a flat region in an image in the image information, wherein
   the pixel array pattern estimation portion calculates the correlation characteristic amount using image information of the flat region in the image detected by the flat region detection portion, and
   the flat region detection portion is implemented via at least one processor.

5. The image processing device according to claim 1, wherein
   the characteristic estimation portion includes a pixel relationship estimation portion that estimates a relationship between pixels in the estimated pixel array pattern,
   wherein the pixel relationship estimation portion is implemented via at least one processor.

6. The image processing device according to claim 5, wherein
   the pixel relationship estimation portion determines different white component pixels and pixels having different charge storage times in the estimated pixel array pattern, based on a pixel value average.

7. The image processing device according to claim 5, wherein
   the pixel relationship estimation portion determines a green component pixel in the estimated pixel array pattern, based on a pixel value histogram.

8. The image processing device according to claim 1, wherein
the processing portion performs at least one of image quality improvement processing, image classification processing and image processing.

9. The image processing device according to claim 1, wherein
the image information is RAW image data.

10. An image processing method comprising:
estimating, from one of image information obtained from an image sensor and information attached to the image information, a characteristic of the image sensor; and
processing the image information in accordance with the estimated characteristic of the image sensor,
wherein the estimated characteristic comprises an estimated pixel array pattern of the image sensor.

11. A non-transitory computer-readable medium having embodied thereon a program, which when executed by a computer causes the computer to execute a method, the method comprising:
estimating, from one of image information obtained from an image sensor and information attached to the image information, the characteristic of the image sensor; and
processing the image information in accordance with the estimated characteristic of the image sensor,
wherein the estimated characteristic comprises an estimated pixel array pattern of the image sensor.

12. The non-transitory computer-readable medium according to claim 11, wherein the executed method further comprises:
determining which of pixel array patterns postulated in advance is most similar to an array of pixels that are spatially close and that have identical characteristics, and
estimating a pixel array pattern of the image sensor that generates the image information.

13. The non-transitory computer-readable medium according to claim 12, wherein the executed method further comprises:
calculating a correlation characteristic amount with respect to a pixel array pattern for each of the pixel array patterns postulated in advance, and
determining which pixel array pattern is most similar based on the calculated correlation characteristic amount.

14. The non-transitory computer-readable medium according to claim 13, wherein the executed method further comprises:
detecting a flat region in an image in the image information,
wherein the correlation characteristic amount is calculated using image information of the detected flat region.

15. The non-transitory computer-readable medium according to claim 11, wherein the executed method further comprises:
estimating a relationship between pixels in the estimated pixel array pattern.

16. The non-transitory computer-readable medium according to claim 15, wherein the executed method further comprises:
determining different white component pixels and pixels having different charge storage times in the estimated pixel array pattern, based on a pixel value average.

17. The non-transitory computer-readable medium according to claim 15, wherein the executed method further comprises:
determining a green component pixel in the estimated pixel array pattern, based on a pixel value histogram.

18. The non-transitory computer-readable medium according to claim 11, wherein the executed method further comprises:
performing at least one of image quality improvement processing, image classification processing and image processing.

19. The non-transitory computer-readable medium according to claim 11, wherein
the image information is RAW image data.

* * * * *